(12) United States Patent
Eiselt

(10) Patent No.: US 7,489,880 B2
(45) Date of Patent: *Feb. 10, 2009

(54) APPARATUS AND METHOD FOR MEASURING THE DISPERSION OF A FIBER SPAN

(75) Inventor: Michael H. Eiselt, Middletown, NJ (US)

(73) Assignee: Pivotal Decisions, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/683,211

(22) Filed: Mar. 7, 2007

(65) Prior Publication Data

US 2007/0153259 A1 Jul. 5, 2007

Related U.S. Application Data

(63) Continuation of application No. 10/427,897, filed on Apr. 30, 2003, now Pat. No. 7,206,516.

(60) Provisional application No. 60/377,083, filed on Apr. 30, 2002.

(51) Int. Cl.
*H04B 10/00* (2006.01)
(52) U.S. Cl. ...................................... 398/208; 398/204
(58) Field of Classification Search ................. 398/147, 398/150, 202–214; 356/73.1
See application file for complete search history.

(56) References Cited

U.S. PATENT DOCUMENTS

| | | | |
|---|---|---|---|
| 4,229,831 A | 10/1980 | Lacher | 398/214 |
| 4,535,459 A | 8/1985 | Hogge, Jr. | 375/324 |
| 4,636,859 A | 1/1987 | Vernhet et al. | 348/468 |
| 4,710,022 A | 12/1987 | Soeda et al. | 356/73.1 |
| 4,779,790 A * | 10/1988 | Wallgren et al. | 228/180.1 |
| 4,799,789 A * | 1/1989 | Tsukamoto et al. | 356/73.1 |
| 4,799,790 A * | 1/1989 | Tsukamoto et al. | 356/73.1 |
| 4,984,884 A * | 1/1991 | Ryu et al. | 356/73.1 |
| 5,003,626 A * | 3/1991 | Kuwahara et al. | 398/204 |
| 5,099,114 A * | 3/1992 | Matsumoto et al. | 250/227.23 |
| 5,128,790 A * | 7/1992 | Heidemann et al. | 398/90 |
| 5,224,183 A | 6/1993 | Dugan | 385/24 |
| 5,225,922 A | 7/1993 | Chraplyvy et al. | 398/94 |

(Continued)

FOREIGN PATENT DOCUMENTS

JP 01115230 5/1989

(Continued)

OTHER PUBLICATIONS

"Polarisation Mode Dispersion in Restricted Optical Bandwidth: An Evaluation of Measurement Techniques," National Physics laboratory, to Harris et al. pp. 1-23.*

(Continued)

*Primary Examiner*—Agustin Bello
(74) *Attorney, Agent, or Firm*—Woodcock Washburn LLP

(57) ABSTRACT

The invention pertains to optical fiber transmission systems, and is particularly relevant to transmission of large volumes of data over long distances at high rates. An improved apparatus and method for measuring dispersion in a fiber span is disclosed. In particular, the invention teaches a highly accurate technique for measuring the fiber dispersion at a single wavelength. Transmitter and receiver structure and data processing algorithms are disclosed.

60 Claims, 6 Drawing Sheets

U.S. PATENT DOCUMENTS

| | | | | |
|---|---|---|---|---|
| 5,267,071 | A | 11/1993 | Little et al. | 398/162 |
| 5,299,048 | A | 3/1994 | Suyama | 398/181 |
| 5,321,502 | A * | 6/1994 | Matsumoto et al. | 356/490 |
| 5,321,541 | A | 6/1994 | Cohen | 398/82 |
| 5,406,368 | A * | 4/1995 | Horiuchi et al. | 356/73.1 |
| 5,455,703 | A | 10/1995 | Duncan et al. | 398/136 |
| 5,543,951 | A * | 8/1996 | Moehrmann | 398/154 |
| 5,559,625 | A | 9/1996 | Smith et al. | 398/66 |
| 5,613,210 | A | 3/1997 | Van Driel et al. | 455/45 |
| 5,673,133 | A * | 9/1997 | Imaoka et al. | 398/202 |
| 5,726,784 | A | 3/1998 | Alexander et al. | 398/91 |
| 5,737,118 | A | 4/1998 | Sugaya et al. | 359/341.43 |
| 5,778,116 | A | 7/1998 | Tomich | 385/16 |
| 5,790,285 | A | 8/1998 | Mock | 398/21 |
| 5,812,290 | A | 9/1998 | Maeno et al. | 398/45 |
| 5,841,563 | A * | 11/1998 | Effenberger | 348/533 |
| 5,877,881 | A | 3/1999 | Miyauchi et al. | 398/193 |
| 5,903,613 | A | 5/1999 | Ishida | 375/340 |
| 5,914,794 | A | 6/1999 | Fee | 398/20 |
| 5,914,799 | A | 6/1999 | Tan | 398/92 |
| 5,917,627 | A * | 6/1999 | King | 398/98 |
| 5,936,753 | A | 8/1999 | Ishikaawa | 398/72 |
| 5,940,209 | A | 8/1999 | Nguyen | 359/341.1 |
| 5,963,350 | A | 10/1999 | Hill | 398/70 |
| 5,969,806 | A * | 10/1999 | Bergano | 356/73.1 |
| 5,995,694 | A | 11/1999 | Akasaka et al. | 385/123 |
| 6,005,702 | A | 12/1999 | Suzuki et al. | 398/185 |
| 6,021,245 | A | 2/2000 | Berger et al. | 385/123 |
| 6,038,062 | A | 3/2000 | Kosaka | 359/337 |
| 6,046,797 | A * | 4/2000 | Spencer et al. | 356/73.1 |
| 6,069,718 | A * | 5/2000 | Khaleghi | 398/27 |
| 6,075,634 | A | 6/2000 | Casper et al. | 398/139 |
| 6,078,414 | A | 6/2000 | Iwano | 398/182 |
| 6,081,360 | A | 6/2000 | Ishikawa et al. | 398/147 |
| 6,084,694 | A | 7/2000 | Milton et al. | 398/83 |
| 6,088,152 | A | 7/2000 | Berger et al. | 359/334 |
| 6,108,074 | A | 8/2000 | Bloom | 356/73.1 |
| 6,122,095 | A | 9/2000 | Fatehi | 359/337 |
| 6,151,334 | A | 11/2000 | Kim et al. | 370/468 |
| 6,157,477 | A | 12/2000 | Robinson | 398/147 |
| 6,160,614 | A | 12/2000 | Unno | 356/73.1 |
| 6,163,392 | A | 12/2000 | Condict et al. | 398/1 |
| 6,163,636 | A | 12/2000 | Stentz et al. | 385/24 |
| 6,173,094 | B1 | 1/2001 | Bowerman et al. | 385/24 |
| 6,177,985 | B1 | 1/2001 | Bloom | 356/73.1 |
| 6,181,450 | B1 * | 1/2001 | Dishman et al. | 398/122 |
| 6,198,559 | B1 | 3/2001 | Gehlot | 398/161 |
| 6,229,599 | B1 | 5/2001 | Galtarossa | 356/73.1 |
| 6,236,481 | B1 | 5/2001 | Laor | 398/9 |
| 6,236,499 | B1 | 5/2001 | Berg et al. | 359/341.2 |
| 6,246,510 | B1 | 6/2001 | BuAbbud et al. | 359/337 |
| 6,259,553 | B1 | 7/2001 | Kinoshita | 359/337 |
| 6,259,554 | B1 | 7/2001 | Shigematsu et al. | 359/337 |
| 6,259,693 | B1 | 7/2001 | Ganmukhi et al. | 370/366 |
| 6,259,845 | B1 | 7/2001 | Sardesai | 385/123 |
| 6,272,185 | B1 | 8/2001 | Brown | 375/340 |
| 6,275,315 | B1 | 8/2001 | Park et al. | 398/148 |
| 6,288,811 | B1 | 9/2001 | Jiang et al. | 398/79 |
| 6,288,813 | B1 | 9/2001 | Kirkpatrick et al. | 398/136 |
| 6,307,656 | B2 | 10/2001 | Terahara | 398/139 |
| 6,317,231 | B1 | 11/2001 | Al-Salameh et al. | 398/34 |
| 6,317,255 | B1 | 11/2001 | Fatehi et al. | 359/341.44 |
| 6,323,950 | B1 * | 11/2001 | Kim et al. | 356/477 |
| 6,327,060 | B1 | 12/2001 | Otani et al. | 398/83 |
| 6,331,991 | B1 * | 12/2001 | Mahgerefteh | 372/33 |
| 6,356,384 | B1 | 3/2002 | Islam | 359/334 |
| 6,359,729 | B1 | 3/2002 | Amoruso | 359/341.1 |
| 6,362,874 | B1 * | 3/2002 | Madsen | 356/73.1 |
| 6,388,801 | B1 | 5/2002 | Sugaya et al. | 359/334 |
| 6,396,853 | B1 | 5/2002 | Humphrey et al. | 370/535 |
| 6,407,805 | B1 * | 6/2002 | Sorin | 356/73.1 |
| 6,426,792 | B1 * | 7/2002 | Yamashita | 356/73.1 |
| 6,429,929 | B2 | 8/2002 | Babin et al. | 356/73.1 |
| 6,433,865 | B1 * | 8/2002 | Kimura et al. | 356/73.1 |
| 6,470,032 | B2 * | 10/2002 | Dudziak et al. | 370/503 |
| 6,480,326 | B2 | 11/2002 | Papernyi et al. | 359/334 |
| 6,515,779 | B2 | 2/2003 | Fee | 398/147 |
| 6,519,082 | B2 | 2/2003 | Ghera et al. | 359/341.4 |
| 6,574,037 | B2 | 6/2003 | Islam et al. | 359/334 |
| 6,586,724 | B2 * | 7/2003 | Graves | 250/227.23 |
| 6,594,003 | B1 * | 7/2003 | Horiuchi et al. | 356/73.1 |
| 6,614,511 | B1 * | 9/2003 | Sakairi et al. | 356/73.1 |
| 6,654,104 | B2 * | 11/2003 | Kimura et al. | 356/73.1 |
| 6,678,041 | B2 * | 1/2004 | Kimura et al. | 356/73.1 |
| 6,714,715 | B2 * | 3/2004 | Johnson | 385/140 |
| 6,728,492 | B1 * | 4/2004 | Baroncelli | 398/154 |
| 6,734,955 | B2 * | 5/2004 | Wight et al. | 356/73.1 |
| 6,744,958 | B2 | 6/2004 | Inagaki et al. | 385/123 |
| 6,744,988 | B2 | 6/2004 | Leclerc et al. | 398/102 |
| 6,750,956 | B2 * | 6/2004 | Moeller | 356/73.1 |
| 6,765,659 | B1 * | 7/2004 | Bhatnagar et al. | 356/73.1 |
| 6,801,306 | B2 * | 10/2004 | Fontaine | 356/73.1 |
| 6,801,308 | B2 * | 10/2004 | Achtenhagen et al. | 356/73.1 |
| 6,807,232 | B2 | 10/2004 | Nicholson et al. | 375/240.26 |
| 6,826,201 | B2 | 11/2004 | Hind | 370/535 |
| 6,912,046 | B2 * | 6/2005 | Brendel | 356/73.1 |
| 6,944,163 | B2 | 9/2005 | Bottorff et al. | 370/395.5 |
| 6,950,448 | B2 | 9/2005 | Tornetta et al. | 370/537 |
| 6,965,739 | B2 * | 11/2005 | Seto et al. | 398/183 |
| 7,027,137 | B2 * | 4/2006 | Kimura | 356/73.1 |
| 7,035,538 | B2 * | 4/2006 | Willner et al. | 398/29 |
| 7,043,271 | B1 * | 5/2006 | Seto et al. | 455/562.1 |
| 7,046,695 | B2 | 5/2006 | Silvers | 370/493 |
| 7,079,231 | B2 * | 7/2006 | Kido et al. | 356/73.1 |
| 7,130,031 | B2 * | 10/2006 | Kimura | 356/73.1 |
| 7,139,277 | B2 | 11/2006 | Ofek et al. | 370/401 |
| 7,170,906 | B2 | 1/2007 | Ofek et al. | 370/498 |
| 7,171,129 | B1 * | 1/2007 | Blair et al. | 398/203 |
| 7,206,516 | B2 * | 4/2007 | Eiselt | 398/147 |
| 7,209,660 | B1 * | 4/2007 | Yee et al. | 398/71 |
| 2001/0050767 | A1 * | 12/2001 | Babin et al. | 356/73.1 |
| 2002/0012152 | A1 | 1/2002 | Agazzi et al. | 398/202 |
| 2002/0044317 | A1 | 4/2002 | Gentner et al. | 359/337.13 |
| 2002/0044324 | A1 | 4/2002 | Hoshida et al. | 398/178 |

FOREIGN PATENT DOCUMENTS

| | | |
|---|---|---|
| JP | 02238736 | 9/1990 |

OTHER PUBLICATIONS

"16×20-Gb/s 400-km WDM Transmission Over NZDSF Using a Slop-Compensating fiber-Grating Module," IEEE Photonics Technology Letters Apr. 2000, pp. 437-439 to Gnauck et al.*

Gnauck et al., "16×20-Gb/s 400-km WDM Transmission Over NZDSF Using a Slop-Compensating fiber-Grating Module," *IEEE Photonics Technology Letters*, Apr. 2000, 437-439.

* cited by examiner

APPARATUS AND METHOD FOR MEASURING THE DISPERSION OF A FIBER SPAN

CROSS REFERENCE TO RELATED APPLICATIONS

This application is a continuation of Ser. No. 10/427,897, now U.S. Pat. No. 7,206,516, entitled "APPARATUS AND METHOD FOR MEASURING THE DISPERSION OF A FIBER SPAN" and filed Apr. 30, 2003, which claims priority to U.S. Provisional Patent Application Ser. No. 60/377,083, entitled "METHOD FOR DISPERSION MEASUREMENT OF AN OPTICAL FIBER AT A FIXED WAVELENGTH", by Michael H. Eiselt, filed Apr. 30, 2002, the entirety of each application is hereby incorporated by reference herein.

FIELD OF THE INVENTION

The present invention relates, in general, to the field of optical communications, and in particular to, an improved apparatus and method for measuring dispersion in a fiber span. In particular, the invention teaches a highly accurate technique for measuring the fiber dispersion at a single wavelength. Transmitter and receiver structure and data processing algorithms are disclosed.

BACKGROUND OF THE INVENTION

A goal of many modern long haul optical transport systems is to provide for the efficient transmission of large volumes of voice traffic and data traffic over trans-continental distances at low costs. Various methods of achieving these goals include time division multiplexing (TDM) and wavelength division multiplexing (WDM). In time division multiplexed systems, data streams comprised of short pulses of light are interleaved in the time domain to achieve high spectral efficiency, high data rate transport. In wavelength division multiplexed systems, data streams comprised of short pulses of light of different carrier frequencies, or equivalently wavelength, co-propagate in the same fiber to achieve high spectral efficiency, high data rate transport.

The transmission medium of these systems is typically optical fiber. In addition, there is a transmitter and a receiver. The transmitter typically includes a semiconductor diode laser, and supporting electronics. The laser may be directly modulated with a data train with an advantage of low cost, and a disadvantage of low reach and capacity performance. After binary modulation, a high bit may be transmitted as an optical signal level with more power than the optical signal level in a low bit. Often, the optical signal level in a low bit is engineered to be equal to, or approximately equal to zero. In addition to binary modulation, the data can be transmitted with multiple levels, although in current optical transport systems, a two level binary modulation scheme is predominantly employed.

Consequently, the data propagates through the optical fiber as a short pulse. One of the impairments that this pulse can suffer is its spreading, or dispersion, in time. Excessive pulse spreading resulting from dispersion will cause interference between adjacent bits at the receiver. Dispersion can occur for a variety of reasons. In multimode fiber, different transverse modes propagate different effective distances, to cause modal dispersion. Consequently, optical transport over any appreciable distance is accomplished using single mode fiber. Chromatic dispersion of the pulse occurs because the index of refraction of the glass fiber varies with frequency. Since a short data pulse is comprised of a band of frequencies, chromatic dispersion causes pulse shape distortion and spreading as the different spectral components of the data pulse propagate at different velocities in the fiber. In modern optical transport systems this dispersion, or pulse spreading, must be periodically corrected while comprehending the effect of pulsewidth on the nonlinear impairments in the fiber.

Chromatic dispersion is therefore an important engineering design parameter in optical transport systems. The glass fiber through which the pulses propagate must be characterized for their dispersion. There are several methods and apparatus available today to do so, but all suffer from various shortcomings.

For example, the pulse delay method measures the differential delay between optical pulses of various wavelengths using a multiple wavelength transmitter at one end of the fiber and a receiver at the other end. Alternatively an optical time domain reflectometer may be used in a single ended measurement. A main disadvantage to the pulse delay method is a limitation in accuracy of the measurement technique caused by errors in determining the arrival times of the pulses due to limitations in the receiver electronics and due to pulse spreading caused by the dispersion in the fiber which is the object of the measurement. These limitations prevent the measurement from being accurate enough for optical transport systems with trans-continental reaches. Consequently, there is a need for dispersion measurement with sufficient precision and accuracy for ultra long haul fiber characterization.

An alternate dispersion measurement technique is the phase shift method. This technique uses a tunable laser source, or a tunable filter/monochromator, to probe the fiber. Here, the tunable source is modulated, and the phase of the modulated signal exiting the fiber is compared with the phase at a second wavelength. The average chromatic dispersion over the interval between the two wavelengths is determined from the phase shift and wavelength interval. In addition to the need for a tunable source, this method suffers from error introduced by the finite spectral width of the tunable source. These limitations prevent the measurement from being accurate enough for optical transport systems with trans-continental reaches. Consequently, there is a need for dispersion measurement with sufficient precision and accuracy for ultra long haul fiber characterization. Another drawback of this technique is the large size and cost of the tunable laser source. There is consequently a need for a technique that comprises affordable and compact equipment. Yet another limitation of this technique is the long measurement time that the method takes, mainly due to the tuning of the laser source or the tunable filter/monochromator. This long time is both inconvenient and increases the errors because of equipment drift. Thus, there is a need for a measurement technique that is performed quickly, since this saves time and produces a result that is less susceptible to drift errors.

It is an object of this invention to teach an improved method and apparatus for measuring dispersion that does not suffer from these limitations in accuracy and precision. It is a further object of this invention to provide a compact apparatus that makes a chromatic dispersion measurement quickly.

SUMMARY OF THE INVENTION

In the present invention, a dispersion measurement technique is taught to measure the dispersion of a fiber span at a single wavelength with high accuracy as required by ultra long haul optical transport systems capable of transcontinental reach.

In one embodiment of the invention, an optical fiber dispersion measurement system is disclosed.

In another embodiment of the invention a method for measuring dispersion in an optical fiber is disclosed.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF ILLUSTRATIVE EMBODIMENTS

While the making and using of various embodiments of the present invention are discussed in detail below, it should be appreciated that the present invention provides many applicable inventive concepts which can be embodied in a wide variety of specific contexts. The specific embodiments described herein are merely illustrative of specific ways to make and use the invention and do not delimit the scope of the invention.

Figure 1:
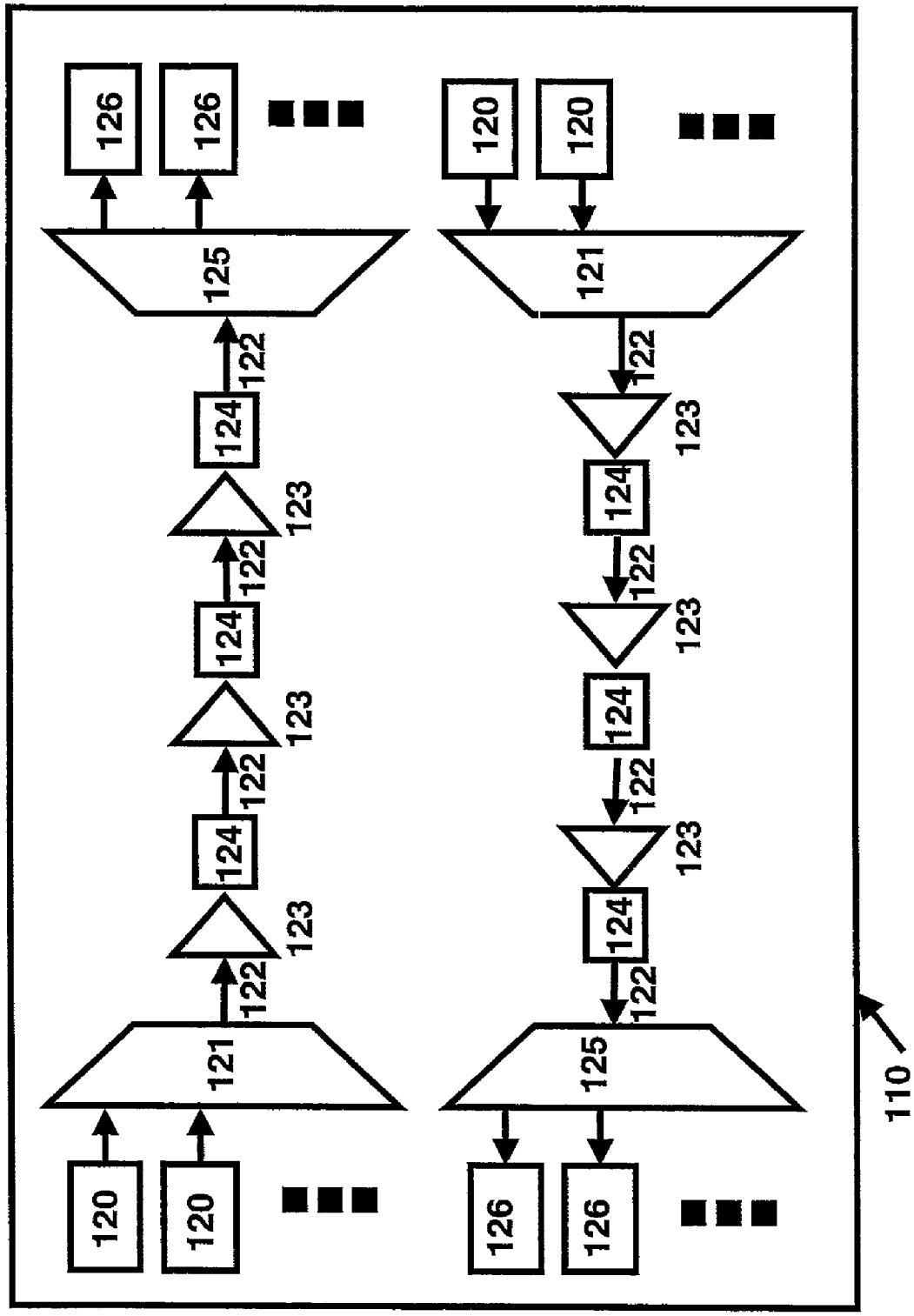
FIG. 1 is a schematic illustration of a prior art multiplexed optical transport system.

FIG. 1 is an illustrative block diagram of a prior art optical transport system 110 for data and/or voice transmission used to support the present invention. Typical long haul optical transport dense wavelength division multiplexed (DWDM) systems transmit forty to eighty 10 Gbps (gigabit per second) channels across distances of 3,000 to 6,000 km in a single 30 nm spectral band. Shown in the figure is a duplex system in which traffic is both transmitted and received between parties at opposite ends of the link. The optical carrier is generated using transmitters 120. In current DWDM long haul transport systems transmitters 120 are DFB lasers stabilized to specified frequencies on the ITU frequency grid and externally modulated.

In a DWDM system, different channels operating at distinct carrier frequencies are multiplexed using a multiplexer 121. Such multiplexers may be implemented using array waveguide (AWG) technology or thin film technology, or a variety of other technologies which are known. After multiplexing, the optical signals are coupled into the transport fiber for transmission to the receiving end of the link. The total link distance may, in modem optical transport systems, be between different cities separated by continental distances, from 1,000 km to 6,000 km, for example. To successfully bridge these distances with sufficient optical signal power relative to noise, the total fiber distance is separated into fiber spans 122, and the optical signal is periodically amplified using in line optical amplifiers 123 after each fiber span 122. Typical fiber span distances between optical amplifiers 123 is 50-100 km. Thus, for example, thirty 100 km spans would be used to transmit optical signals between points 3,000 km apart. Examples of inline optical amplifiers 123 include erbium doped fiber amplifiers (EDFAs) and semiconductor optical amplifiers (SOAs).

Often, there is also included dispersion compensation modules 124 with the in line amplifiers 123. These dispersion compensator modules 124 adjust the phase information of the optical pulses in order to compensate for the chromatic dispersion in the optical fiber while appreciating the role of optical nonlinearities in the optical fiber.

At the receiving end of the link, the optical channels are de-multiplexed using a demultiplexer 125. Such de-multiplexers may be implemented using array waveguide (AWG) technology or thin film technology, or a variety of other technologies known in the art. Each channel is then optically coupled to separate optical receivers 126. The optical receiver 126 is typically comprised of a semiconductor photodetector and accompanying electronics.

It is a purpose of this invention to teach improved apparatus and methods for characterizing the properties of the fiber spans 122. In particular, the invention relates to a dispersion measurement technique to measure the dispersion at a single wavelength with a high accuracy.

It should be noted that FIG. 1 depicts an optical transport system 110 supporting duplex operation wherein each endpoint can both send and receive voice and data traffic. This is important to achieve a typical conversation. In FIG. 1, duplex operation is shown to use two distinct fibers, the both together often referred to as a fiber pair. FIG. 1 is bi-restrictive in this or in many other instances. For example, optical transport systems are sometimes deployed with bidirectional traffic providing duplex service on a single fiber.

Other common variations in the prior art include the presence of post-amplifiers and preamplifiers just before and after the multiplexer 121 and de-multiplexer 125. Another variation that may be employed is the optical dropping and adding of channels at cities located in between the two end cities. The invention disclosed herein, would find application. in any of these variations, as well as others. For example, the improved dispersion measurement technique taught herein would benefit short reach, or metro applications which may not include an inline optical amplifier 123.

Prior to installation of the dispersion compensation module 124, the dispersion of a transmission fiber span 122 needs to be measured to determine the correct amount of dispersion compensation. Knowing the fiber type, it is sufficient to measure the dispersion at the center of the transmission band. Furthermore, it is desirable to measure the relative dispersion slope in order to verify the fiber type. The range of dispersion, D, to be measured is determined by the fiber type, the maximum length of the fiber span 122, and the wavelength band (C-band or L-band). The required precision of the measurement is mainly determined by the dispersion tolerance of the transmission system, and this tolerance differs with fiber type. Specific requirements on this dispersion measurement include a dispersion range of 30 to 2500 ps/nm. This range would allow for span distances between 30 km of LS type fiber to 130 km of SMF-28 type fiber and operation in the L-band. The accuracy of the dispersion measurement should be +/−10 ps/nm for SMF-28 type fiber and +/−3. ps/nm for LEAF type fiber. The measurement technique should withstand fiber losses as low as 8 dB and as high as 33 dB, again to cover fiber spans between 30 km and 130 km. The dispersion measurement technique should also cover a range of relative dispersion slope (RDS). This range should be between 1/RDS=15 nm (for LS type fiber) and 1/RDS=330 nm (for SMF-28 type fiber). The 1/RDS accuracy must be +/−20 nm. This is generally sufficient to distinguish between different commercially available fiber types.

Figure 2:
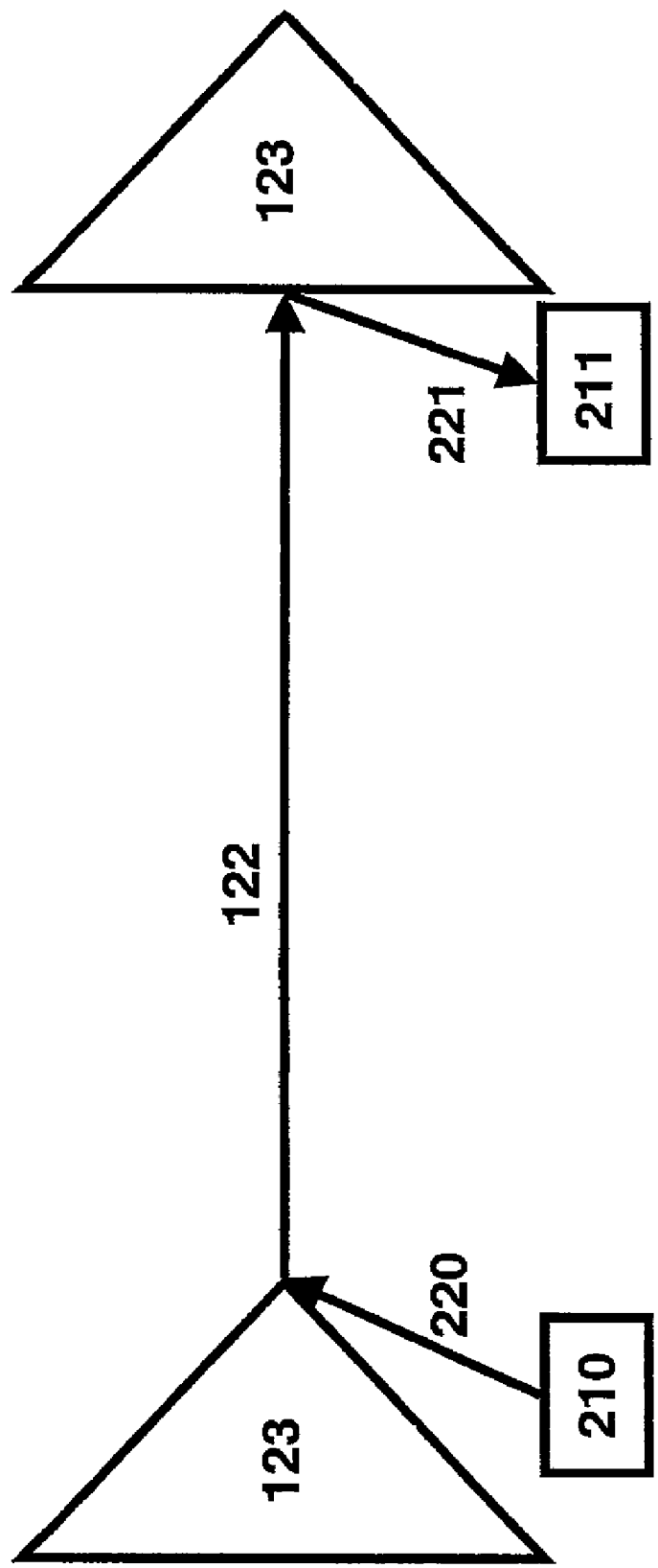
FIG. 2 is a schematic illustration of the invention deployed to measure dispersion in a fiber span.

In FIG. 2 is shown the deployment of the invention to measure a fiber span 122 between two in line optical amplifiers 123. A measurement transmitter module 210 is optically coupled by optical coupling means 220 to the head end of the fiber span 122. A measurement receiver module 211 is optically coupled to the other end of the fiber span by optical coupling means 221. Representative examples of optical coupling means 220 and 221 include fiber pigtails, free space coupling potentially including focusing elements, or other optical transmitting structure.

Figure 3:
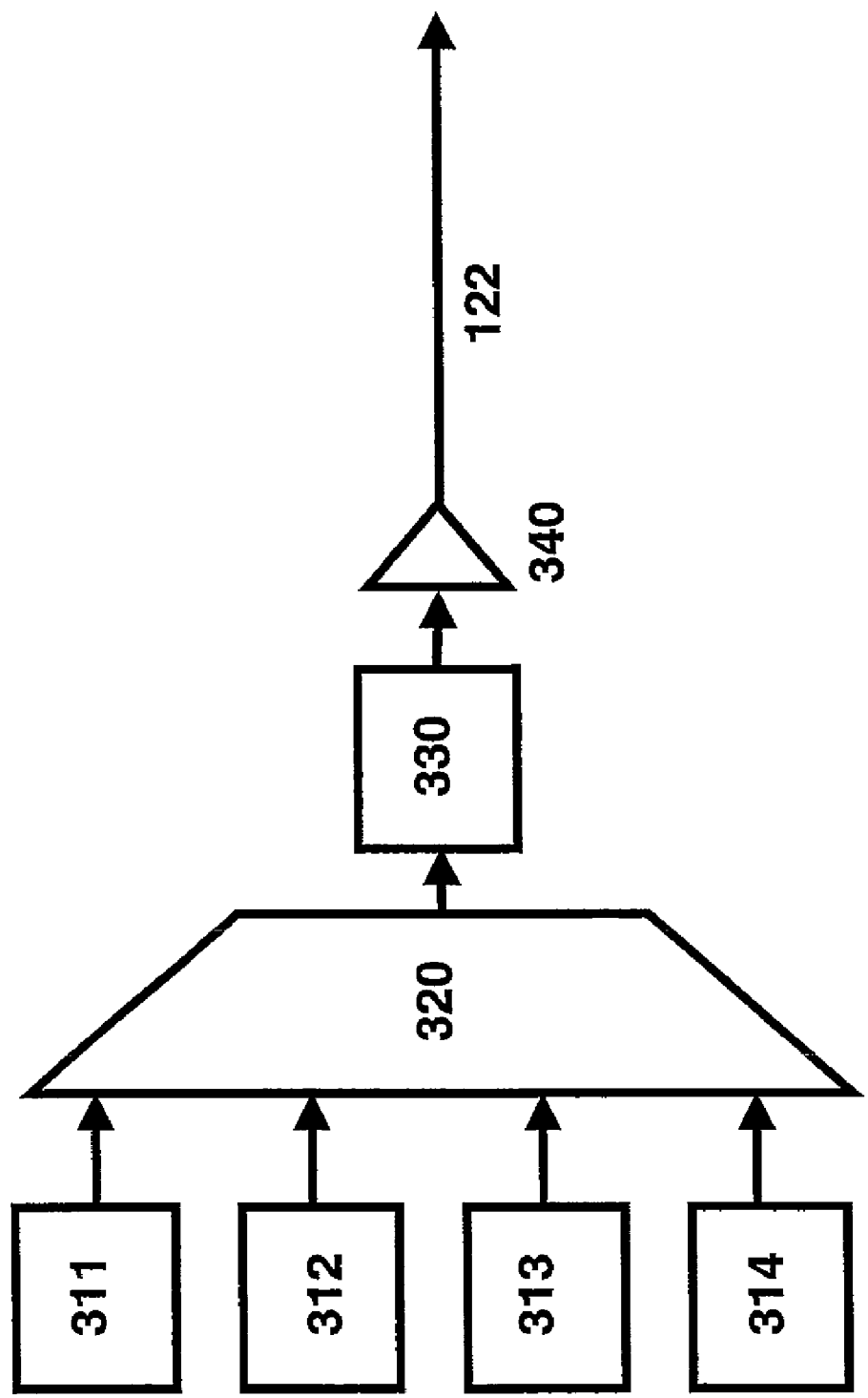
FIG. 3 is a schematic illustration of the measurement transmitter module, which is a subject of this invention.

In FIG. 3 is shown the measurement transmitter module 210 of the invention, and its relation to the fiber span 122 that is to be measured. The measurement transmitter module comprises four measurement lasers, 311, 312, 313, and 314, coupling means 320, intensity modulator 330 and optical amplifier 340. Measurement laser 311 emits a laser signal at wavelength $\lambda_1$, measurement laser 312 emits a laser signal at wavelength $\lambda_2$, measurement laser 313 emits a laser signal at wavelength $\lambda_3$, and measurement laser 314 emits a laser signal at wavelength $\lambda_4$. The difference between wavelengths $\lambda_1$, and $\lambda_2$ is $\Delta\lambda$, the difference between wavelengths $\lambda_2$ and $\lambda_3$ is $\Delta\lambda$ and the difference between wavelengths $\lambda_3$ and $\lambda_4$ is $\Delta\lambda$. The four wavelengths of the measurement lasers 311, 312, 313, and 314 are centered around a target wavelength $\lambda_0$. The light of these four continuous wave measurement lasers 311, 312, 313, and 314 is coupled together via coupling means 320. In the preferred embodiment, coupling means 320 is a multiplexer. Other embodiments of coupling means 320 can include an array waveguide (AWG), thin film technology, fiber couplers, or through a variety of other technologies. The combined light from the four measurement lasers are then modulated at a sinusoidal frequency $f_m$ using intensity modulator 330. In a preferred embodiment, the modulation depth of the modulated composite laser signal should be between 10% and 50%. Intensity modulator 330 may be realized using a lithium niobate modulator or an electro-absorption modulator, or using one of a variety of other modulator technologies. Optical amplifier 340 may be used to boost the measurement laser signals to a value sufficient to overcome loss in the fiber span 122. Optical amplifier 340 may be realized using erbium doped fiber amplifiers (EDFAs) or semiconductor optical amplifiers, or using one of a variety of other optical amplifier technologies. In a preferred embodiment, a semiconductor optical amplifier is used to both modulate the measurement laser signals and simultaneously amplify the measurement laser signals.

An improved accuracy and precision of the dispersion measurement is achieved when the wavelength separation, $\Delta\lambda$ of the output wavelengths of measurement lasers 311, 312, 313 and 314 is tightly controlled. Center wavelength $\lambda_0$ may be controlled to +/−0.1 nm, while wavelength separation $\Delta\lambda$ must be controlled to +/−0.02 nm. In a preferred embodiment this is accomplished using a multi-wavelength laser on a single substrate. In another preferred embodiment this is accomplished by locating the four lasers in close proximity to achieve thermal coupling among the lasers.

Figure 4:
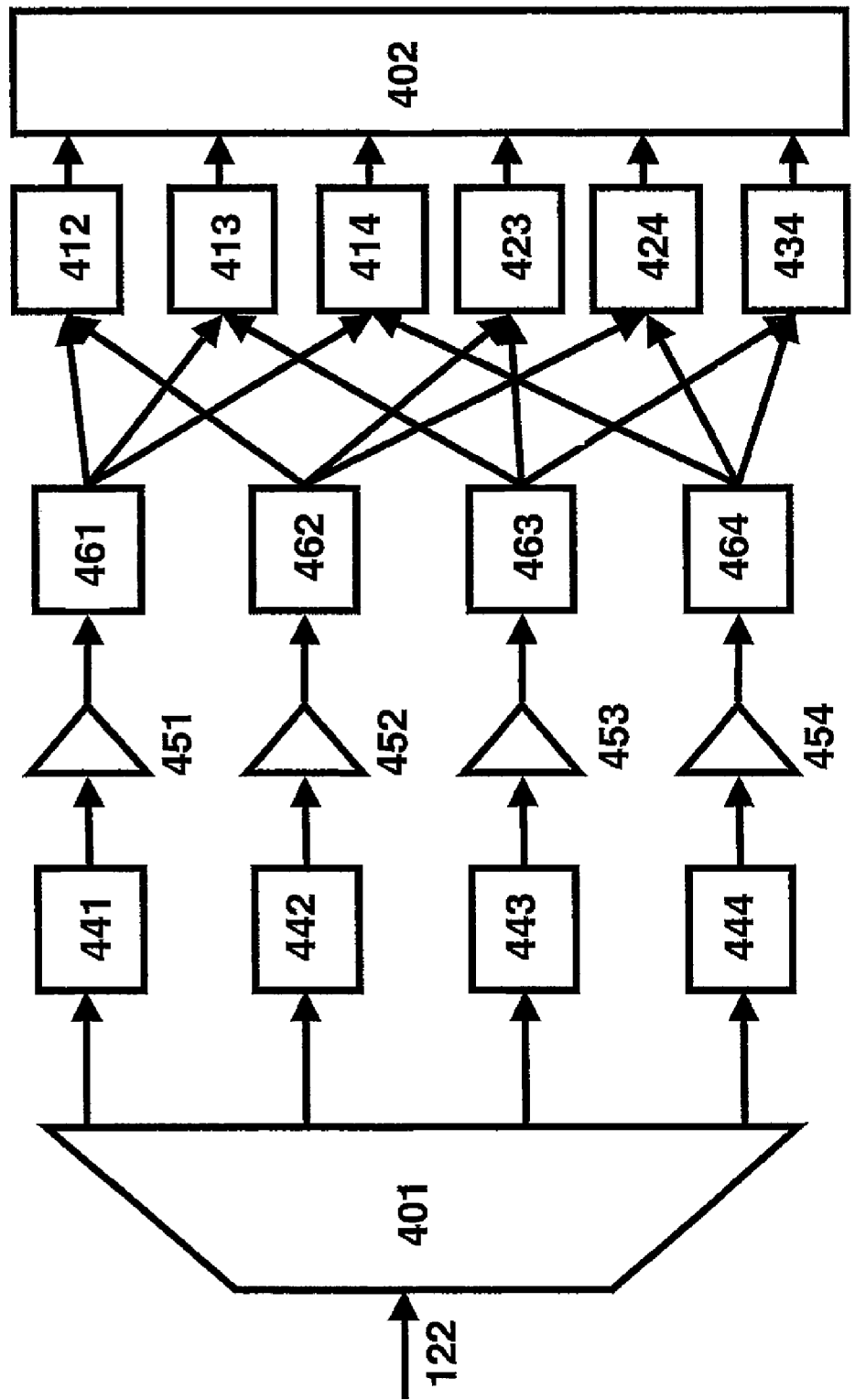
FIG. 4 is a schematic illustration of the measurement receiver module, which is a subject of this invention.

In FIG. 4 is shown the measurement receiver module 211 of the invention, and its relation to the fiber span 122 that is to be measured. The measurement modulator module comprises optical de-multiplexer 401, four receiver photodiodes 441, 442, 443, and 444, four electronic amplifiers 451, 452, 453, and 454, four narrowband electronic filters 461, 462, 463, and 464, six phase comparators, 412, 413, 414, 423, 424 and 434, and processing block 402. In a preferred embodiment, the receiver photodiodes 441, 442, 443 and 444 may be implemented using PIN photodiodes. In another preferred embodiment receiver photodiodes 441, 442, 443, and 444 are implemented with avalanche photodiodes with improved responsively enabling lower launch power in the measurement transmitter module. The output signal of receiver photodiode 441 is amplified by electronic amplifier 451, then filtered by narrowband electronic filter 461. Narrowband electronic filter 461 is a bandpass filter with a central frequency $f_m$. The output signal of receiver photodiode 442 is amplified by electronic amplifier 452, then filtered by narrowband electronic filter 462. Narrowband electronic filter 462 is a bandpass filter with a central frequency $f_m$. The output signal of receiver photodiode 443 is amplified by electronic amplifier 453, then filtered by narrowband electronic filter 463. Narrowband electronic filter 463 is a bandpass filter with a central frequency $f_m$. The output signal of receiver photodiode 444 is amplified by electronic amplifier 454, then filtered by narrowband electronic filter 464. Narrowband electronic filter 464 is a bandpass filter with a central frequency $f_m$.

The output of narrowband electronic filter 461 is split and sent to phase comparator 412, 413 and 414. The output of narrowband electronic filter 462 is split and sent to phase comparator 412, 423 and 424. The output of narrowband electronic filter 463 is split and sent to phase comparator 413, 423 and 434. The output of narrowband electronic filter 464 is split and sent to phase comparator 414, 423 and 434.

Phase comparator 412 compares the phase of signals from narrowband electronic filter 461 and narrowband electronic filter 462. The output signal of phase comparator 412 is proportional to the phase difference between the signal received by photodetector 441 and photodetector 442 and therefore proportional to group delay difference between wavelengths $\lambda_1$ and $\lambda_2$. Phase comparator 413 compares the phase of signals from narrowband electronic filter 461 and narrowband electronic filter 463. The output signal of phase comparator 413 is proportional to the phase difference between the signal received by photodetector 441 and photodetector 443 and therefore proportional to group delay difference between wavelengths $\lambda_1$ and $\lambda_3$. Phase comparator 414 compares the phase of signals from narrowband electronic filter 461 and narrowband electronic filter 464. The output signal of phase comparator 414 is proportional to the phase difference between the signal received by photodetector 441 and photodetector 444 and therefore proportional to group delay difference between wavelengths $\lambda_1$ and $\lambda_3$. Phase comparator 423 compares the phase of signals from narrowband electronic filter 462 and narrowband electronic filter 463. The output signal of phase comparator 423 is proportional to the phase difference between the signal received by photodetector 442 and photodetector 443 and therefore proportional to group delay difference between wavelengths $\lambda_2$ and $\lambda_3$ Phase comparator 424 compares the phase of signals from narrowband electronic filter 462 and narrowband electronic filter 464. The output signal of phase comparator 424 is proportional to the phase difference between the signal received by photodetector 442 and photodetector 444 and therefore proportional to group delay difference between wavelengths $\lambda_2$ and $\lambda_3$. Phase comparator 434 compares the phase of signals from narrowband electronic filter 463 and narrowband electronic filter 464. The output signal of phase comparator 434 is proportional to the phase difference between the signal received by photodetector 443 and photodetector 444 and therefore proportional to group delay difference between wavelengths $\lambda_3$ and $\lambda_4$. Processing block 402 is further comprised of an analog to digital converter (ADC) and a digital signal processor (DSP) including a memory.

The modulation frequency $f_m$ must be chosen to be as high as possible to improve timing accuracy with a given phase error at the phase comparators 412, 413, 414, 423, 424 and 434, but needs to be small enough to avoid aliasing effects from phase differences larger than 180 degrees. The optimum modulation frequency is then determined by the maximum allowable modulation phase shift of 180 degrees between neighbor wavelengths. The maximum modulation frequency $f_{m,max}$ can then be calculated as $$f_{m,\max} = \frac{180}{360} \frac{1}{D\Delta\lambda}, \text{ where:}$$

D=range of dispersion; $\Delta\lambda$=change in wavelength.

As an example, for $\Delta\lambda$=10 nm and D=2500 ps/mn, $f_{m,max}$=20 MHz. As the measurement accuracy increases with higher $f_m$, it may be desirable to allow for different modulation frequencies for different fiber types. For example, higher precision is required for lower dispersion fibers (such as LEAF type fiber and TW type fiber) than for SMF type fiber. In a preferred embodiment a tunable modulator 330 with tunable narrowband electronic filters 461, 462, 463, 464 are used to optimally measure the dispersion in different fiber types. It may be noted that the wavelength separations between the four probe wavelengths is on the order of 3-10 nm, which is larger than the typical ITU grid. A subset of ITU wavelength lasers may be used to implement measurement lasers 311, 312, 313 and 314.

The output values of phase comparators 413, 414, 423, 424 and 434 are voltages which ideally should be linearly proportional to the phase differences between the received signals. In a preferred embodiment, the Analog Devices AD8302 phase detector maybe used. In this typical phase detector, the linearity is true over a range of 15 degrees to 165 degrees. For phase differences in the range of 0 degrees to 15 degrees, and in the range of 165 degrees to 180 degrees, the characteristics deviate from a linear curve. However, the full range 0 degrees to 180 degrees can be utilized with an acceptably small phase error if the phase detector is characterized and a phase-voltage lookup table is constructed. The phase voltage look-up table is implemented in the preferred embodiment by storing the look-up table in processing block 402 and accessing it to interpret the non-linear ranges of the phase detector.

In processing block 402, the output values of phase comparators 412, 413, 414, 423, 424 and 434 are converted from analog to digital and processed according to a seven step algorithm programmed in processing block 402. In a preferred embodiment, the phase converter AD8302 has an output voltage range of 2 volts for a phase swing of 180 degrees. Based on a phase detector accuracy of 1 degree, a resolution of 0.1 degree, or 1 mV should be sufficient, requiring a 12 bit analog to digital converter.

In step 1 of the data processing algorithm programmed in processing block 402, the voltage output values of each phase detector are read and converted to phase difference values using the phase-voltage look-up table. According to this step in the data processing algorithm, six phase difference values exist in units of degrees. These phase difference values are $\phi_{12}$ corresponding to the phase difference measured by phase comparator 412, $\phi_{13}$ corresponding to the phase difference measured by phase comparator 413, $\phi_{14}$ corresponding to the phase difference measured by phase comparator 414, $\phi_{23}$ corresponding to the phase difference measured by phase comparator 423, $\phi_{24}$ corresponding to the phase difference measured by phase comparator 424, $\phi_{34}$ corresponding to the phase difference measured by phase comparator 434.

In step 2 of the data processing algorithm programmed in processing block 402, the ambiguity that may be present in $\phi_{13}$, $\phi_{14}$, and $\phi_{24}$, must be corrected according to the following set of rules.

a. If $\phi_{12}+\phi_{23}>180$ then $\phi_{13}:=360-\phi_{13}$
b. If $\phi_{23}+\phi_{34}>180$ then $\phi_{24}:=360-\phi_{24}$
c. If $\phi_{12}+\phi_{23}+\phi_{34}>180$ and $\phi_{12}+\phi_{23}+\phi_{34}<360$) then $\phi_{14}:=360-\phi_{14}$
d. If $\phi_{12}+\phi_{23}+\phi_{34}>360$ then $\phi_{14}:=360+\phi_{14}$ If the modulation frequency $f_m$ has been chosen correctly, then the phase differences $\phi_{12}$, $\phi_{23}$, and $\phi_{34}$ will be between 0 degrees and 180 degrees and will be unambiguous.

In step 3 of the data processing algorithm programmed in processing block 402, the phase differences are corrected for the propagation differences in the receiver according to the results of a calibration run, which have been stored in memory.

In step 4 of the data processing algorithm programmed in processing block 402, the corrected phase differences are converted into group delay differences, $\tau_{xy}$ in psec using the known modulation frequency $f_m$ in MHz according to the formula:

$$\tau_{xy} = \frac{10^6 \varphi_{xy}}{360 f_m}$$

In step 5 of the data processing algorithm programmed in processing block 402, the group delay differences are used to calculate the group delay at the four known probe wavelengths $\lambda_j$. The group delay at $\lambda_1$ is set to zero, and the four group delay values $\tau_j$ are calculated as:

$$\tau_1 = 0$$
$$\tau_2 = \frac{1}{4}(2\tau_{12} + \tau_{13} - \tau_{23} + \tau_{14} - \tau_{24})$$
$$\tau_3 = \frac{1}{4}(2\tau_{13} + \tau_{12} - \tau_{23} + \tau_{14} - \tau_{34})$$
$$\tau_4 = \frac{1}{4}(2\tau_{14} + \tau_{12} - \tau_{24} + \tau_{13} - \tau_{34})$$

In step 6 of the data processing algorithm programmed in processing black 402, a second order polynomial, $$\tau(\lambda) = a_2\lambda^2 + a_1\lambda + a_0$$

is fit to this set of four ($\lambda_j, \tau_j$) pairs by using a least squared error fit. Here a formal description is given, involving the inversion of a 3×3 matrix:

$$S_k = \sum_{j=1}^{4} \lambda_j^k$$

$$t_k = \sum_{j=1}^{4} \tau_j \lambda_j^k$$

-continued $$\begin{vmatrix} a_2 \\ a_1 \\ a_0 \end{vmatrix} = \begin{vmatrix} s_4 & s_3 & s_2 \\ s_3 & s_2 & s_1 \\ s_2 & s_1 & s_0 \end{vmatrix}^{-1} \begin{vmatrix} t_2 \\ t_1 \\ t_0 \end{vmatrix}$$

In an alternate embodiment, this might be coded in single steps. The wavelength may be normalized to the center wavelength $\lambda_0$ in order to limit round-off errors in the quartic terms of the calculation.

In step 7 of the data processing algorithm programmed in processing block 402, knowledge of $a_2$, $a_1$ and $a_0$ is used to calculate the dispersion at the central wavelength, $D(\lambda_0)$:

$$D(\lambda_0) = 2a_2\lambda_2 + a_2$$

As the group delay $\tau$ is measured in ps, and the wavelengths are measured in nm, the dispersion units will be in ps/nm. The dispersion slope S can be obtained from the second derivative of $\tau$ with respect to wavelength:

$$S(\lambda_0) = 2a_2$$

The unit of the dispersion slope is ps/nm2. The inverse relative dispersion slope K is then calculated as:

$$K(\lambda_0) = \frac{D(\lambda_0)}{S(\lambda_0)}$$

Figure 5:
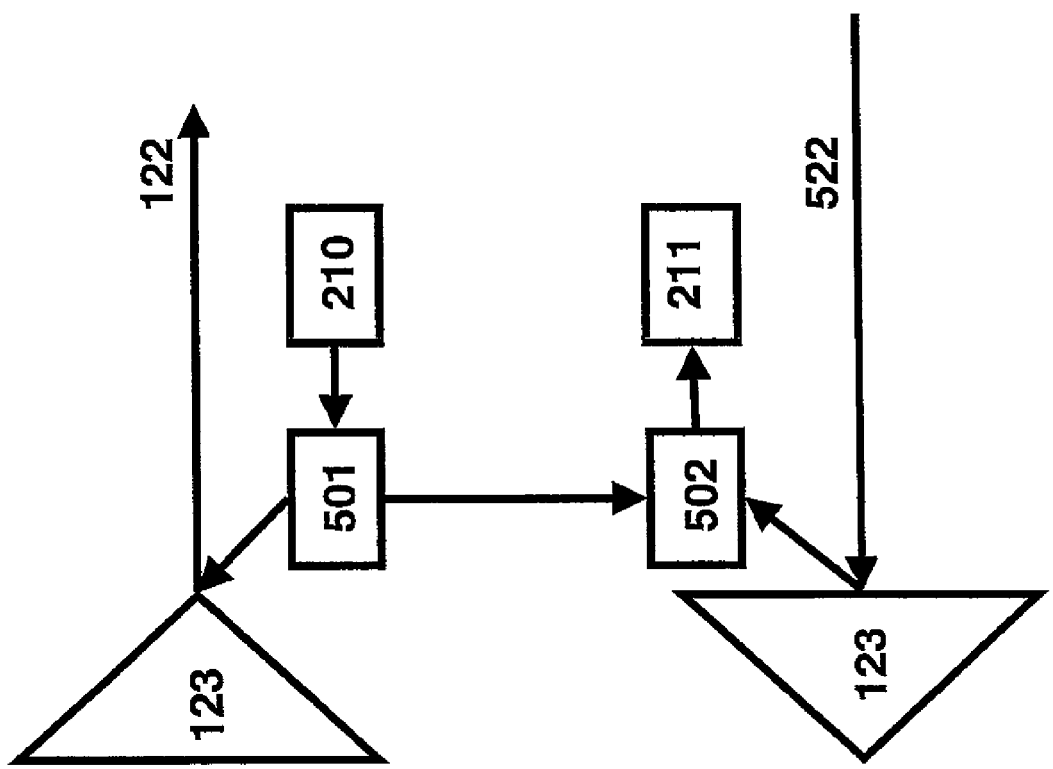
FIG. 5 is a schematic illustration of the invention deployed in a two fiber duplex transport system, including a calibration connection.

In FIG. 5 is shown an alternate embodiment for calibration of the dispersion measurement equipment in an optical transport system offering duplex operation on a pair of fibers. Measurement transmitter module 210 is shown in relation to the first fiber span 122 from one of the two fibers, a second fiber span 522 from the second of the two fibers, optical amplifiers 123, and measurement receiver module 211. Also shown in the figure is optical coupling element 501 and optical coupling element 502. The purpose of optical coupling element 501 and optical coupling element 502 is to enable a connection for calibration of the different path lengths for different wavelengths in the measurement receiver module. In a preferred embodiment, optical coupling element 501 is a 1% tap that routes 1% of the modulated light signal towards measurement receiver module 211. In this preferred embodiment, optical coupling element 502 is a 1 by 2 optical switch that enables measurement receiver module 211 to monitor the output of fiber span 522 or the calibration signal from measurement transmitter module 210.

Before dispersion measurement of the fiber span is taken, the receiver module needs to be calibrated to account for propagation delay differences between the four wavelength signals after de-multiplexing in the receiver. While all the transmitters produce a perfectly synchronous modulation on all wavelengths, the path lengths for the different wavelength signals in the receiver can differ slightly. By switching to a calibration signal that has not experienced chromatic dispersion, the path differences can be measured and stored in the signal processing device. A calibration signal without chromatic dispersion is available at the local transmitter directly adjacent the receiver. In the preferred embodiment, an optical switch at the receiver input is thrown to receive a signal directly from the local transmitter. This signal has not experienced chromatic dispersion and should yield a group delay of zero for all wavelengths. Measurement group delay values are stored in memory and taken into account in step 3 of the data processing algorithm to be described later.

As shown in FIG. 4, in order to facilitate calibration and to accommodate small random path length variations, the path length between the four wavelength signal branches from the demultiplexer to the photodetector should differ by approximately 5 degrees of modulation frequency $f_m$. For example, at $f_m = 20$ MHz, 5 degrees results in a difference of about 700 ps. 700 ps corresponds to a fiber length difference of about 14 cm between neighbor wavelengths. For example, the path for $\lambda_4$ should be 14 cm longer than the path for $\lambda_4$, which should be 14 cm longer than the path for $\lambda_2$ which in turn should be 14 cm longer than the path for $\lambda_1$.

Figure 6:
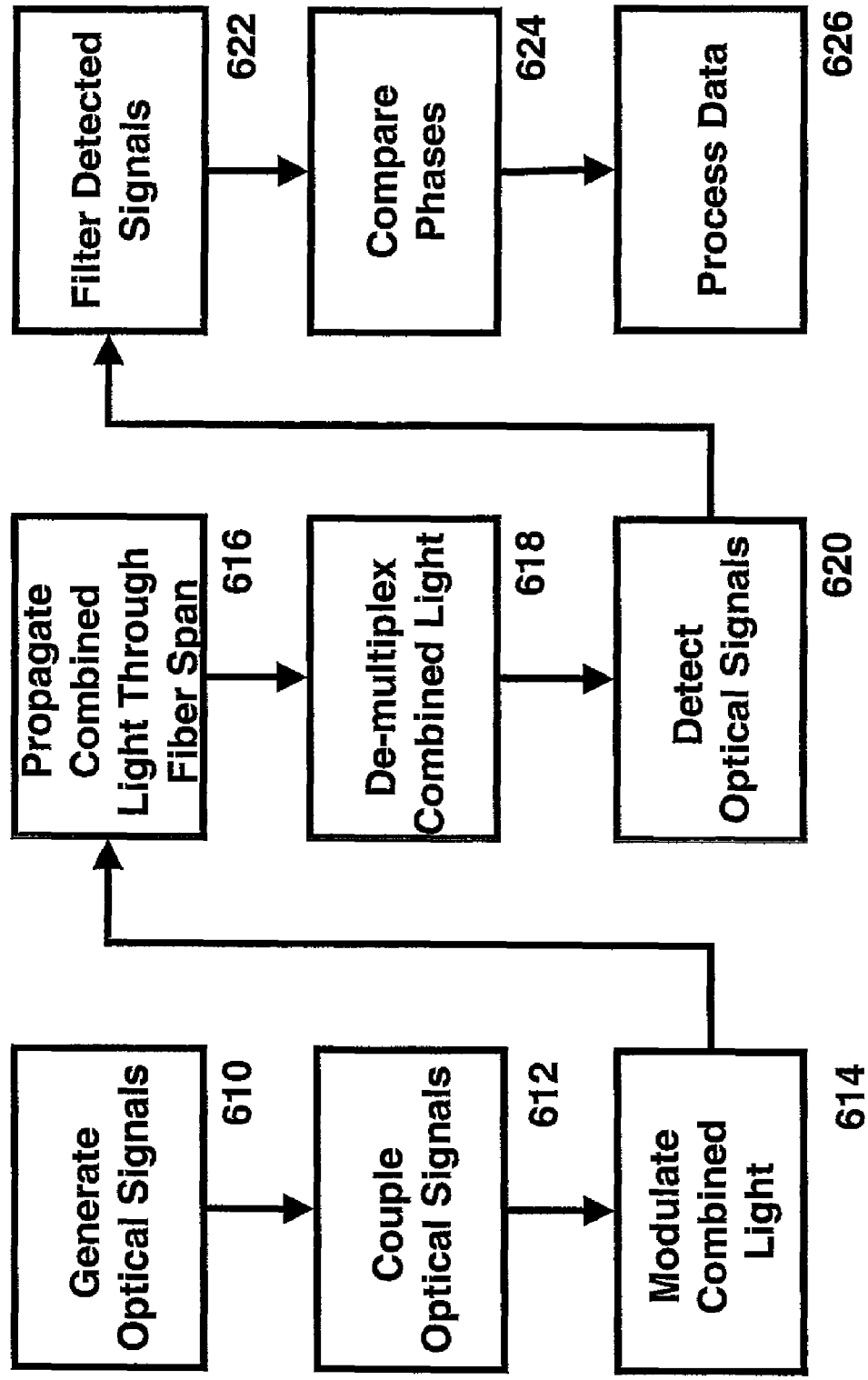
FIG. 6 is a flow chart depicting the method of dispersion measurement, which is a subject of this invention.

In FIG. 6 is a flow chart depicting the method of dispersion measurement. In step 610, four laser signals are generated, at wavelengths $\lambda_1$, $\lambda_2$, $\lambda_3$, and $\lambda_4$ The difference between wavelengths $\lambda_1$, and $\lambda_2$ is $\Delta\lambda$, the difference between wavelengths $\lambda_2$, and $\lambda_3$ is $\Delta\lambda$ and the difference between wavelengths $\lambda_3$, and is $\Delta\lambda$. The four wavelengths are centered around a target wavelength So. In step 612, the light of these four continuous wave measurement lasers are coupled together. In step 614, the combined light from the four measurement lasers are then modulated at a sinusoidal frequency $f_m$ using intensity modulator. In a preferred embodiment, the modulation depth of the modulated composite laser signal should be between 10% and 50%. In Step 616, the modulated combined light from the four measurement lasers is propagated down a fiber span, to be characterized. In step 618, the combined light is de-multiplexed, and in step 620, the light from the four lasers is detected on four receiver photodetectors. In step 620, the outputs from these four photodetectors is filtered in a narrow-band electronic filter. In step 622 the phases of each signal pair is compared. In step 624 the data is processed in order to calculate the dispersion and the dispersion slope at target wavelength $\lambda_0$.

While this invention has been described in reference to illustrative embodiments, this description is not intended to be construed in a limiting sense. Various modifications and combinations of the illustrative embodiments, as well as. other embodiments of the invention, will be apparent to persons skilled in the art upon reference to the description. It is therefore intended that the appended claims encompass any such modifications or embodiments.

The invention claimed is:

1. An optical fiber dispersion measurement system comprising:
    a measurement transmitter module connected to an optical fiber, wherein the measurement transmitter module is configured to produce a modulated signal from at least four combined optical signals; and
    a measurement receiver module connected to the optical fiber, wherein the measurement receiver module is configured to receive the modulated signal and to separate the modulated signal into at least four separate optical signals, and
    wherein the measurement receiver module is further configured to determine a plurality of phase differences associated with the at least four separate optical signals.

2. The optical fiber dispersion measurement system of claim 1 wherein the modulated signal has a sinusoidal frequency.

3. The optical fiber dispersion measurement system of claim 1 wherein the modulated signal includes a modulation depth of about 10% to 50%.

4. The optical fiber dispersion measurement system of claim 1 wherein the measurement transmitter module comprises:
    a first laser configured to emit a first optical signal, a second laser configured to emit a second optical signal, a third laser configured to emit a third optical signal and a fourth laser configured to emit a fourth optical signal;

a coupler connected to the first, second, third and fourth lasers, wherein the coupler is configured to produce the at least four combined optical signals; and an intensity modulator connected to the coupler and to the optical fiber, wherein the intensity modulator is configured to produce the modulated signal.

5. The optical fiber dispersion measurement system of claim 4 wherein the first optical signal includes a first wavelength, wherein the second optical signal includes a second wavelength, wherein the third optical signal includes a third wavelength, wherein the fourth optical signal includes a fourth wavelength, and wherein the first and second wavelengths, the second and third wavelengths, and the third and fourth wavelengths each define a respective wavelength difference.

6. The optical fiber dispersion measurement system of claim 5 wherein the first, second, third and fourth wavelengths are each centered around a target wavelength.

7. The optical fiber dispersion measurement system of claim 6 wherein the target wavelength is controlled to ±0.1 nm.

8. The optical fiber dispersion measurement system of claim 5 wherein each of the respective wavelength differences is controlled to ±0.02 nm.

9. The optical fiber dispersion measurement system of claim 4 wherein the coupler comprises a multiplexer.

10. The optical fiber dispersion measurement system of claim 4 wherein the coupler comprises an array waveguide.

11. The optical fiber dispersion measurement system of claim 4 wherein the measurement transmitter module further includes an amplifier connected to the intensity modulator, wherein the amplifier is configured to amplify the modulated signal.

12. The optical fiber dispersion measurement system of claim 1 wherein the measurement receiver module comprises:

a decoupler connected to the optical fiber, wherein the decoupler is configured to separate the modulated signal to produce the at least four separate optical signals.

13. The optical fiber dispersion measurement system of claim 12 wherein the decoupler comprises a demultiplexer.

14. The optical fiber dispersion measurement system of claim 12 wherein the measurement receiver module further comprises a plurality of photodiodes, each connected to the decoupler, and wherein the plurality of photodiodes are configured to convert the at least four separate optical signals to at least four separate electrical signals.

15. The optical fiber dispersion measurement system of claim 14 wherein the measurement receiver module further comprises a plurality of amplifiers, each connected to one of the plurality of photodiodes, and wherein each of the plurality of amplifiers are configured to amplify one of the at least four separate electrical signals.

16. The optical fiber dispersion measurement system of claim 14 wherein the measurement receiver module further comprises a plurality of filters, each connected to one of the plurality of photodiodes, wherein each of the plurality of filters are configured to filter one of the at least four separate electrical signals, and wherein each of the plurality of filters has a respective central frequency that is approximately equal to a modulated frequency of the modulated signal.

17. The optical fiber dispersion measurement system of claim 14 wherein the measurement receiver module further comprises a plurality of comparators, each connected to two of the plurality of photodiodes, and wherein the plurality of comparators are configured to determine the plurality phase differences.

18. The optical fiber dispersion measurement system of claim 17 wherein the measurement receiver module further comprises a processor connected to the plurality of comparators, wherein the processor is configured to calculate at least one of dispersion or dispersion slope based on the respective plurality of phase differences.

19. The optical fiber dispersion measurement system of claim 18 wherein the processor is configured to correct for a phase difference ambiguity according to a predetermined set of rules.

20. The optical fiber dispersion measurement system of claim 18 wherein the processor is configured to compensate for propagation differences in the measurement receiver module using a calibration result.

21. The optical fiber dispersion measurement system of claim 1 wherein the modulated signal has a modulation frequency that is determined based on a maximum allowable modulation shift of 180 degrees between neighboring wavelengths of the at least four combined optical signals.

22. A system for calibrating dispersion measurement equipment, the system comprising:

a measurement transmitter module connected to a first optical fiber, wherein the measurement transmitter module is configured to produce a first modulated signal from at least four combined optical signals;

a measurement receiver module connected to a second optical fiber, wherein the measurement receiver module is configured to receive a second modulated signal and to separate the second modulated signal into at least four separate optical signals, and wherein the measurement receiver module is further configured to determine a plurality of phase differences associated with the at least four separate optical signals;

a first coupling element connected to the measurement transmitter module; and a second coupling element connected to the first coupling element and to the measurement receiver module, wherein the first coupling element is configured to route at least a portion of the first modulated signal to the second coupling element to facilitate a calibration of the measurement receiver module.

23. The system of claim 22 wherein the measurement transmitter module comprises:

a first laser configured to emit a first optical signal, a second laser configured to emit a second optical signal, a third laser configured to emit a third optical signal and a fourth laser configured to emit a fourth optical signal;

a coupler connected to the first, second, third and fourth lasers, wherein the coupler is configured to produce the at least four combined optical signals; and an intensity modulator connected to the coupler and to the first optical fiber, wherein the intensity modulator is configured to produce the first modulated signal.

24. The system of claim 22 wherein the measurement receiver module comprises:

a decoupler connected to the second optical fiber, wherein the decoupler is configured to separate the second modulated signal to produce the at least four separate optical signals.

25. The system of claim 24 wherein the decoupler comprises a demultiplexer.

26. The system of claim 24 wherein the measurement receiver module further comprises a plurality of photodiodes, each connected to the decoupler, and
wherein the plurality of photodiodes are configured to convert the at least four separate optical signals to at least four separate electrical signals.

27. The system of claim 26 wherein the measurement receiver module further comprises a plurality of amplifiers, each connected to one of the plurality of photodiodes, and
wherein each of the plurality of amplifiers are configured to amplify one of the at least four separate electrical signals.

28. The system of claim 26 wherein the measurement receiver module further comprises a plurality of filters, each connected to one of the plurality of photodiodes,
wherein each of the plurality of filters are configured to filter one of the at least four separate electrical signals, and
wherein each of the plurality of filters has a respective central frequency that is approximately equal to a modulated frequency of the second modulated signal.

29. The system of claim 26 wherein the measurement receiver module further comprises a plurality of comparators, each connected to two of the plurality of photodiodes, and
wherein the plurality of comparators are configured to determine the plurality phase differences.

30. The system of claim 29 wherein the measurement receiver module further comprises a processor connected to the plurality of comparators, wherein the processor is configured to calculate at least one of dispersion or dispersion slope based on the plurality of phase differences.

31. The system of claim 30 wherein the processor is configured to correct for a phase difference ambiguity according to a predetermined set of rules.

32. The system of claim 22 wherein the first coupling element comprises a tap that is configured to route approximately 1% of the first modulated signal to the second coupling element.

33. The system of claim 22 wherein the second coupling element comprises a 1 by 2 optical switch that enables the measurement receiver module to receive at least one of the second modulated signal or the portion of the first modulated signal.

34. The system of claim 22 wherein the portion of the first modulated signal is devoid of chromatic dispersion.

35. The system of claim 22 wherein the portion of the first modulated signal comprises a plurality of calibration signals, and
wherein the measurement receiver module is configured to measure a respective group delay between each of the plurality of calibration signals and to store a result of the measurement in a memory to facilitate the calibration.

36. A method of measuring dispersion in an optical fiber span, the method comprising:
receiving a modulated signal via the optical fiber span, wherein the modulated signal includes a plurality of combined optical signals, and wherein the plurality of combined optical signals include:
a first optical signal having a first wavelength;
a second optical signal having a second wavelength;
a third optical signal having a third wavelength; and
a fourth optical signal having a fourth wavelength, wherein the first and second wavelengths, the second and third wavelengths, and the third and fourth wavelengths each define a respective wavelength difference;
de-multiplexing the modulated signal to produce a plurality of separate optical signals;
determining a plurality of phase differences associated with the plurality of separate optical signals; and
calculating dispersion based on the plurality of phase differences.

37. The method of claim 36 further comprising calculating a dispersion slope at a target wavelength based on the plurality of phase differences.

38. The method of claim 36 further comprising generating the plurality of separate optical signals and combining the plurality of separate optical signals to produce the plurality of combined optical signals.

39. The method of claim 36 further comprising modulating the plurality of combined optical signals at a sinusoidal frequency to produce the modulated signal.

40. The method of claim 39 further comprising setting the sinusoidal frequency based on a maximum allowable modulation phase shift of 180 degrees between neighboring wavelengths of each of the plurality of combined optical signals.

41. The method of claim 36 further comprising amplifying the modulated signal and transmitting the modulated signal over the optical fiber span.

42. The method of claim 36 further comprising converting the plurality of separate optical signals to a plurality of separate electrical signals.

43. The method of claim 42 further comprising amplifying the plurality of separate electrical signals.

44. The method of claim 42 further comprising filtering the plurality of separate electrical signals at a center frequency that is approximately equal to a modulated frequency of the modulated signal.

45. The method of claim 42 wherein determining the plurality of phase differences associated with the plurality of separate optical signals includes comparing a phase of each of the plurality of separate electrical signals to one another.

46. The method of claim 36 further comprising correcting for an ambiguity in at least one of the plurality of phase differences.

47. The method of claim 36 further comprising correcting for a propagation difference in a receiver based on a calibration result.

48. The method of claim 36 further comprising converting the plurality of phase differences into a plurality of group delay differences.

49. The method of claim 36 wherein the plurality of phase differences comprise:
a first phase difference between the first and second optical signals;
a second phase difference between the second and third optical signals; and
a third phase difference between the third and fourth optical signals.

50. The method of claim 36 wherein the plurality of phase differences comprise:
a first phase difference between the first and second optical signals;
a second phase difference between the first and third optical signals;
a third phase difference between the first and fourth optical signals;

a fourth phase difference between the second and third optical signals;

a fifth phase difference between the second and fourth optical signals; and a sixth phase difference between the third and fourth optical signals.

51. A receiver for measuring dispersion in an optical fiber span, the receiver comprising:

means for receiving a modulated signal that includes a plurality of combined optical signals, wherein the plurality of combined optical signals include:

a first optical signal having a first wavelength;

a second optical signal having a second wavelength;

a third optical signal having a third wavelength; and a fourth optical signal having a fourth wavelength, wherein the first and second wavelengths, the second and third wavelengths, and the third and fourth wavelengths each define a respective wavelength difference;

means for separating the modulated signal to produce a plurality of separate optical signals;

means for determining a plurality of phase differences associated with the plurality of separate optical signals; and means for measuring the dispersion of the optical fiber span based on the plurality of phase differences.

52. The receiver of claim 51 further comprising means for converting the plurality of separate optical signals into a plurality of separate electrical signals.

53. The receiver of claim 52 further comprising means for amplifying the plurality of separate electrical signals.

54. The receiver of claim 52 further comprising means for filtering the plurality of separate electrical signals at a center frequency that is approximately equal to a modulated frequency of the plurality of combined optical signals.

55. The receiver of claim 51 wherein the modulated signal is modulated at a modulating frequency that is based on a maximum allowable modulation phase shift of 180 degrees between neighboring wavelengths of each of the plurality of combined optical signals.

56. The receiver of claim 51 further comprising means for correcting for an ambiguity in at least one of the plurality of phase differences.

57. The receiver of claim 51 further comprising means correcting for a propagation difference in the receiver based on a calibration result.

58. The receiver of claim 51 further comprising means for converting the plurality of phase differences into a plurality of group delay differences.

59. The receiver of claim 51 wherein the plurality of phase differences comprise:

a first phase difference between the first and second optical signals;

a second phase difference between the second and third optical signals; and a third phase difference between the third and fourth optical signals.

60. The receiver of claim 51 wherein the plurality of phase differences comprise:

a first phase difference between the first and second optical signals;

a second phase difference between the first and third optical signals;

a third phase difference between the first and fourth optical signals;

a fourth phase difference between the second and third optical signals;

a fifth phase difference between the second and fourth optical signals; and a sixth phase difference between the third and fourth optical signals.

* * * * *

UNITED STATES PATENT AND TRADEMARK OFFICE
CERTIFICATE OF CORRECTION

PATENT NO. : 7,489,880 B2
APPLICATION NO. : 11/683211
DATED : February 10, 2009
INVENTOR(S) : Michael H. Eiselt Page 1 of 1

It is certified that error appears in the above-identified patent and that said Letters Patent is hereby corrected as shown below:

COL. 12, line 14 (claim 18), delete "respective"

Signed and Sealed this

Fourteenth Day of April, 2009

JOHN DOLL
*Acting Director of the United States Patent and Trademark Office*